United States Patent
Jong et al.

(10) Patent No.: US 8,960,992 B2
(45) Date of Patent: Feb. 24, 2015

(54) BOTTLE WARMER AND MIXING APPARATUS

(75) Inventors: Gerrit Jan de Jong, Drachten (NL); Pieter Johannes Bax, Drachten (NL); Frank Theodoor van de Scheur, Amersfoort (NL)

(73) Assignee: Koninklijke Philips N.V., Eindhoven (NL)

( * ) Notice: Subject to any disclaimer, the term of this patent is extended or adjusted under 35 U.S.C. 154(b) by 1123 days.

(21) Appl. No.: 12/936,537

(22) PCT Filed: Apr. 13, 2009

(86) PCT No.: PCT/IB2009/051533
§ 371 (c)(1),
(2), (4) Date: Oct. 6, 2010

(87) PCT Pub. No.: WO2009/128015
PCT Pub. Date: Oct. 22, 2009

(65) Prior Publication Data
US 2011/0033587 A1 Feb. 10, 2011

(30) Foreign Application Priority Data
Apr. 16, 2008 (EP) ..................... 08103556

(51) Int. Cl.
*B01F 11/00* (2006.01)
*A47J 36/24* (2006.01)

(52) U.S. Cl.
CPC .................... *A47J 36/2438* (2013.01)
USPC ............ 366/110; 366/146; 366/149; 366/209

(58) Field of Classification Search
CPC ..... B01F 15/06; B01F 15/065; B01F 11/0034
USPC ......... 366/110, 111, 112, 144, 146, 212, 209, 366/149; 219/628, 726
See application file for complete search history.

(56) References Cited

U.S. PATENT DOCUMENTS

| | | | | |
|---|---|---|---|---|
| 3,061,280 A * | 10/1962 | Kraft et al. | .................... | 366/110 |
| 3,539,156 A | 11/1970 | Zipperer et al. | | |
| 3,601,372 A * | 8/1971 | Harmes | ........................ | 366/219 |
| 4,673,297 A * | 6/1987 | Siczek et al. | ................... | 366/208 |
| 5,052,812 A * | 10/1991 | Tannenbaum et al. | ........ | 366/209 |
| 5,558,437 A * | 9/1996 | Rode | ............................ | 366/208 |
| 5,577,837 A * | 11/1996 | Martin et al. | ................... | 366/145 |
| 5,808,276 A | 9/1998 | Padilla | | |
| 6,417,498 B1 | 7/2002 | Shields et al. | | |
| 7,287,386 B2 | 10/2007 | Upadhye et al. | | |
| 2008/0087659 A1 | 4/2008 | Norman et al. | | |
| 2008/0149539 A1* | 6/2008 | Burkhard | ..................... | 209/327 |

FOREIGN PATENT DOCUMENTS

GB 735674 8/1955

* cited by examiner

*Primary Examiner* — Charles Cooley
*Assistant Examiner* — Marc C Howell

(57) ABSTRACT

A bottle warmer and mixing apparatus comprises a mixing unit (50) arranged to agitate a bottle (3) to mix contents therein. A heating unit is arranged to heat the contents of the bottle. The heating unit is at least partially decoupled from the agitation generated by the mixing unit (50).

10 Claims, 4 Drawing Sheets

BOTTLE WARMER AND MIXING APPARATUS

FIELD OF THE INVENTION

The subject matter relates to a bottle warmer and mixing apparatus, and more specifically, to an apparatus for warming and mixing contents of a baby bottle.

BACKGROUND OF THE INVENTION

Parents use a bottle warmer and a mixer to heat and mix milk for their baby. This milk can be either breast milk or pre-prepared formula milk. The bottle warmer is able to heat the milk, and bring the milk from refrigeration temperature (around 5° C.) to body temperature (around 37° C.).

Document U.S. Pat. No. 6,417,498 discloses a receptacle-type heating device for automatically warming and vibrating a multitude of containers simultaneously in order to thaw, warm and mix cold or frozen liquid in an expedient and accurate manner.

Preparing formula milk by mixing milk powder into water may be difficult. If the bottle is stirred too softly, the milk powder may not dissolve properly, and a residue can remain. If the bottle is stirred too severely, foam appears, and air is enclosed in the liquid. This may be undesired for the baby.

Hence, an improved bottle warmer and mixing apparatus would be advantageous, and in particular a more efficient mixing apparatus for mixing of the milk during warming.

SUMMARY OF THE INVENTION

Accordingly, the present subject matter preferably seeks to mitigate, alleviate or eliminate one or more of the above mentioned disadvantages singly or in combination. In particular, it may be seen as an object of the present subject matter to provide a bottle warmer and mixing apparatus that can warm and mix the milk in a determined and controlled manner.

The present invention provides a bottle warmer and mixing apparatus, comprising: a mixing unit arranged to agitate a bottle to mix contents therein; a heating unit arranged to heat the contents of the bottle; wherein the heating unit is at least partially decoupled from the agitation generated by the mixing unit.

Thus, an efficient heating and mixing of the contents of the bottle is achieved. In a second aspect, the present invention provides a method of warming and mixing the contents of a bottle using the above bottle warmer and mixing apparatus, wherein the method comprises:
 coupling the bottle to the mixing unit;
 programming the mixing unit;
 switching on the heating unit and the mixing unit; and
 controlling the mixing unit in order to agitate the bottle to mix the contents of the bottle.

BRIEF DESCRIPTION OF THE DRAWINGS

The present invention will now be described, by way of example only, with reference to the accompanying drawings, in which.

DETAILED DESCRIPTION OF THE EMBODIMENTS

Figure 1:
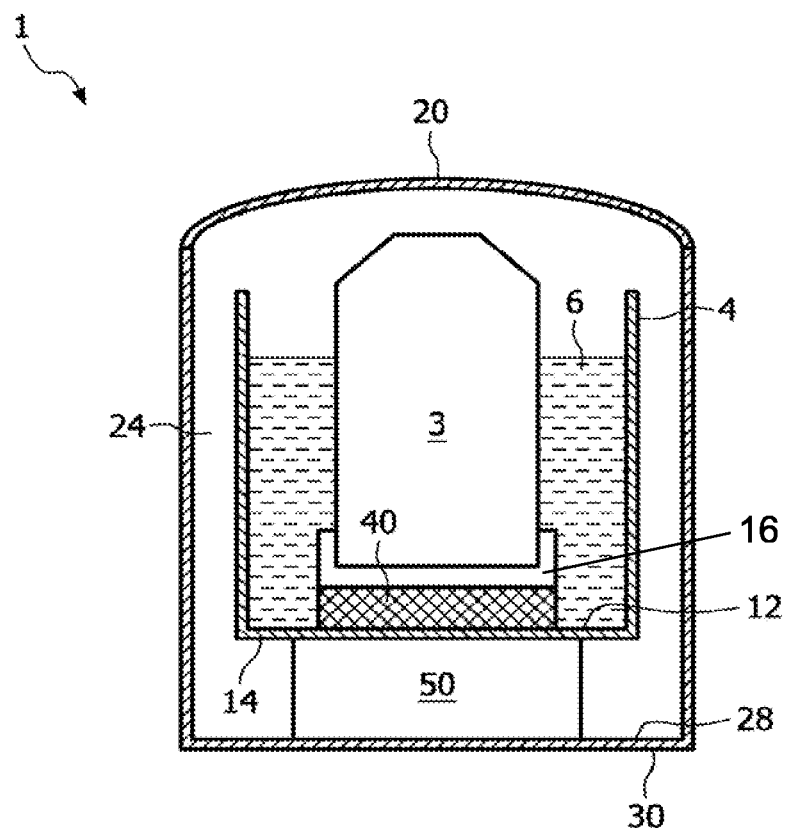
FIG. 1 schematically illustrates an exemplary bottle warmer and mixing apparatus for illustration of the present invention.

Referring to FIG. 1, a bottle warmer and mixing apparatus 1 is shown for illustration of the present invention. The bottle warmer and mixing apparatus 1 comprises an inner housing 4 having an internal space which defines a reservoir 6. The reservoir is configured to receive water. The reservoir is formed by the inner housing 4, which has one or more reservoir walls and a reservoir base 12. The reservoir base 12 has a lower surface 14.

A bottle 3, preferably a baby bottle, is releasably secured in the reservoir 6 by a mount 16 coupled to the reservoir base 12. The mount 16 and bottle 3 are dimensioned to fit together. The mount 16 may comprise any fixing means, in particular a friction fit or a mechanical fixing means, which secures the bottle 3 to the mount 16 during mixing. The mount 16 allows the bottle 3 to be released from the mount 3 with application of a normal (human) force, and in particular, without tools.

The bottle 3 has contents which are intended to be heated and mixed by the apparatus 1. The contents may be formula powder and water, which are mixed to produce formula for a baby.

The bottle warmer and mixing apparatus 1 further comprises a heating unit arranged to warm the contents of the bottle. The heating unit comprises a heating element 40 located in the reservoir 6. The heating element 40 in FIG. 1 is located between the mount 16 and reservoir base 12. The reservoir, when containing water and heated by the heating element 40, can be considered to form a water bath for heating the bottle contents.

The bottle warmer and mixing apparatus 1 further comprises a programmable mixing unit 50 configured to move the bottle 3 and produce agitation of the contents. The mixing unit 50 preferably generates movement in the form of 2-dimensional motion, such that the mixing unit 50 stirs and/or shakes the bottle 3. The mixing unit 50 is coupled to the mount 16 in order to agitate the bottle 3.

The bottle warmer and mixing apparatus 1 optionally comprises an outer housing 20 defining an internal space 24 in which the reservoir 6, bottle 3 and mixing unit 50 are located. The mixing unit 50 sits on internal surface 28 of a base 30 of the outer housing 20.

Figure 2:
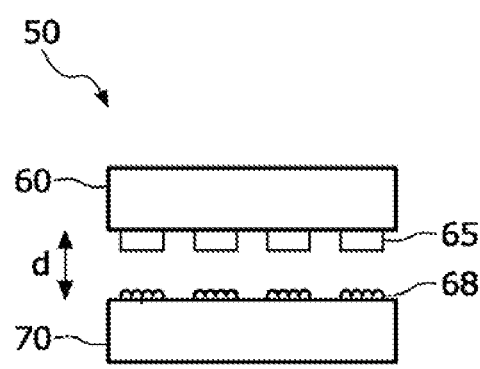
FIG. 2 schematically illustrates an exemplary programmable mixing unit according to an embodiment of the present invention.

Referring to FIG. 2, the mixing unit 50 can move the bottle 3 in two-dimensions. The mixing unit 50 is preferably a dual-axis linear induction motor, also known as a dual-axis linear motor. The mixing unit 50 comprises a top plate 60, preferably formed of metal, and provided with magnets 65. The mixing unit 50 further comprises a bottom plate 70, preferably formed of metal, and provided with a plurality of coils 68.

The top plate 60 and the bottom plate 70 are held apart at a small distance. By steering current through the coils 68 in a pre-defined way, the interaction of the coils 68 and magnets 65 generates relative movement between the top and bottom plates in pre-defined patterns. The movement of the bottle is controlled to mix its contents, the movement is not merely an uncontrolled vibration. The movement generated agitates the formula powder and the water, causing the contents of the bottle to be mixed well in a controlled manner.

The mixing unit 50 generates motion of the bottle by electromagnetic forces. The use of electromagnetic forces has the advantage that it eliminates the need for mechanical transmission members between the drive and the vibrating system. This reduces wear and noise to a minimum. Further, the vibratory motion is generated and proceeds substantially without the creation of noise. Thus, the mixing unit 50 carries out shaking and stirring actions, and moves in a two dimensional plane. An optimal effect can be reached when the mixing unit 50 vibrates at a natural frequency. These shaking and stirring actions may improve heat conduction through the water of the reservoir by mixing the water so that water heated by the heating element 40 is distributed to adjacent the bottle 3.

The mixing unit 50 may be programmed with a plurality of different programs. The programs in the programmable mixing unit 50 include different selectable types of motion, such as contour, lissajous, sequence, clockwise and counter clockwise.

The mixing unit 50 may be controlled by a control unit, preferably an electronic control unit, through which programs may be selected by a user. The programs provide pre-determined movements to obtain optimal mixing. The user may enter the temperature, the amount and concentration of milk etc, and the control unit may determine which of the programs to run based on that input.

The mixing unit, or vibrating actuator, may be part of a control system with position sensing, and an electronic power stage. A closed loop control system ensures that the vibrating actuator performs a movement corresponding to the programmed sequence. Further, it is possible to measure the mechanical resonant frequency of the system (dependent on the bottle content), so that the system can choose an optimal operating point. A sense function can, for instance, be fulfilled by additional measuring coils in the vibrating actuator.

The programmable mixing unit 50 operates in a two-dimensional plane. The movements in the two-dimensional plane are freely programmable and an optimal effect is reached when it is driven in its own frequency.

Various parameters such as stirring rate, frequency, the stroke and the phase of movement of the particles in the bottle can be programmed. Further, programming may include (but not limited to) modes for:
  a) different liquid volumes
  b) different weights of milk powder
  c) time duration of cycles
  d) number of cycles
  e) minimum temperature and
  f) maximum temperature.

Based on the volume of water and weight of mixing powder input by the user, there can be a pre-programmed set of commands that are activated to move the programmable mixing unit in a two-dimensional plane.

The user need not be aware of the complex programming actions, or the best liquid motion for mixing formula. The user generally does not specify the technical settings. The programmable mixing unit is programmed such that for a certain combination of water, milk powder etc, the optimal mixing action is automatically performed. The vibrating actuator has an intelligent control system that provides the opportunity to perform a specific controlled movement, bringing the milk into a specific motion.

The programmable mixing unit 50 can produce an agitation of the contents of the bottle 3, by generating vibrations, and also producing a rotary stirring action in the liquid contents of the bottle.

The disclosed programmable mixing unit generates special wave patterns in the contents of the bottle. Further, a rotating liquid stream could be generated. It is also possible to monitor/adjust the stroke, the frequency and the phase of and direction to achieve optimal mixing of the contents of the bottle.

Figure 3:
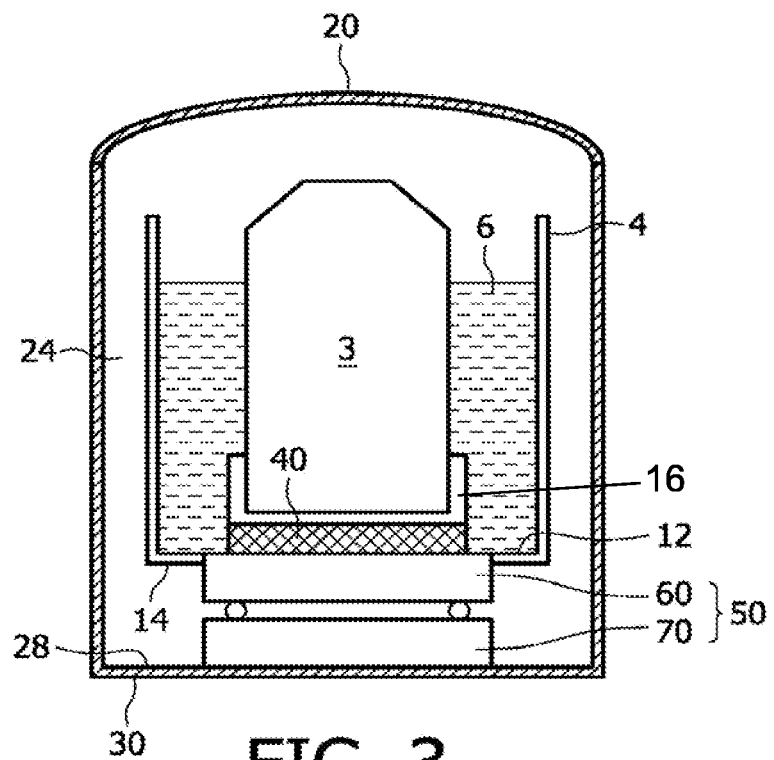
FIG. 3 schematically illustrates an exemplary bottle warmer and mixing apparatus for illustration of the present invention.

Referring to FIG. 3, the heating element 40 is disposed on the reservoir base 12 and is coupled directly to the top plate 60 of the programmable mixing unit 50. The programmable mixing unit 50 is coupled directly to the inner housing 4. The top plate of the mixing unit 50 generates the mixing movement. The inner housing 4 and the mount 16 are mounted to the top plate of the mixing unit 50, and can be moved by the mixing unit 50. This pre-defined movement results in mixing of formula milk powder and water into baby formula in the bottle 3.

Figure 4:
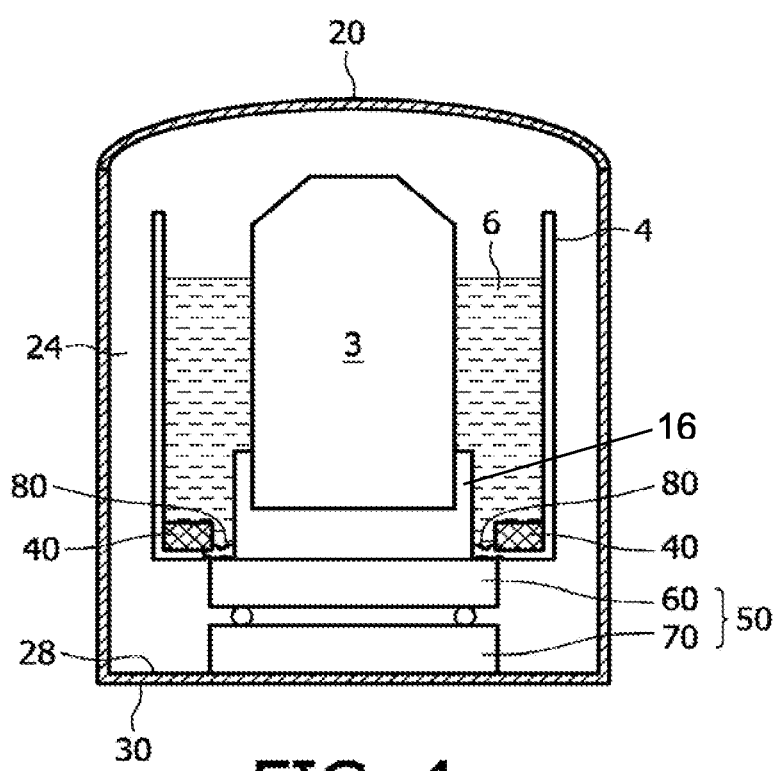
FIG. 4 schematically illustrates a bottle warmer and mixing apparatus according to an embodiment of the present invention.

Referring to FIG. 4, an apparatus 1 according to the present invention has a mixing unit 50 which is decoupled from the inner housing 4 and the heating element 40. The inner housing 4 is attached to the mixing unit 50 through a flexible hose 80. The inner housing 4 and heating element 40 are at least partially decoupled by the flexible hose 80, and so receive only some or none of the agitation movement produced by the mixing unit 50. The decoupling by the hose 80 of at least part of the inner housing 4 and/or heating element 40 reduces the mass which is moved by the mixing unit 50 during mixing, since the inner housing 4 and the heating element 40 are not rigidly connected to the programmable mixing unit 50. A heating unit can be considered to be formed of the heating element 40 and the reservoir configured to receive water. The mount 16 is directly coupled with the mixing unit 50 and is moved by the mixing unit 50 to agitate the contents of the bottle 3.

The heating element 40 may be any type of heater able to heat the water to a pre-determined temperature. In particular, the heating element 40 may comprise one or more resistance wires which heat up when a current is passed through the resistance wire(s).

The hose 80 is attached to the inner housing 4 to avoid leakage. The hose 80 forms part of the reservoir base 12, and provides a seal to assist in retaining the water. The hose is preferably in the form of an annulus. The hose 80 surrounds the mount 16 and connects to the inner housing 4 to form a water-tight seal to maintain water in the reservoir 6. The inner housing 4 is isolated from the movements of the mount 16, and may be supported by the flexible hose 80 or by a rigid mechanical connection to any static platform, e.g. outer housing 20 or base 30.

The heating element 40 is located in the reservoir, and separated from the mixing unit 50 by the flexible hose 80. The heating element may be mounted on the reservoir base against the reservoir walls, or alternatively, may be located on the reservoir base or on the reservoir walls. The top plate 60 of mixing unit 50, mount 16 and the bottle 3 are the only moving parts. This allows a relatively low input to be capable of producing a satisfactory vibratory effect on the bottle 3, thereby increasing efficiency.

Figure 5:
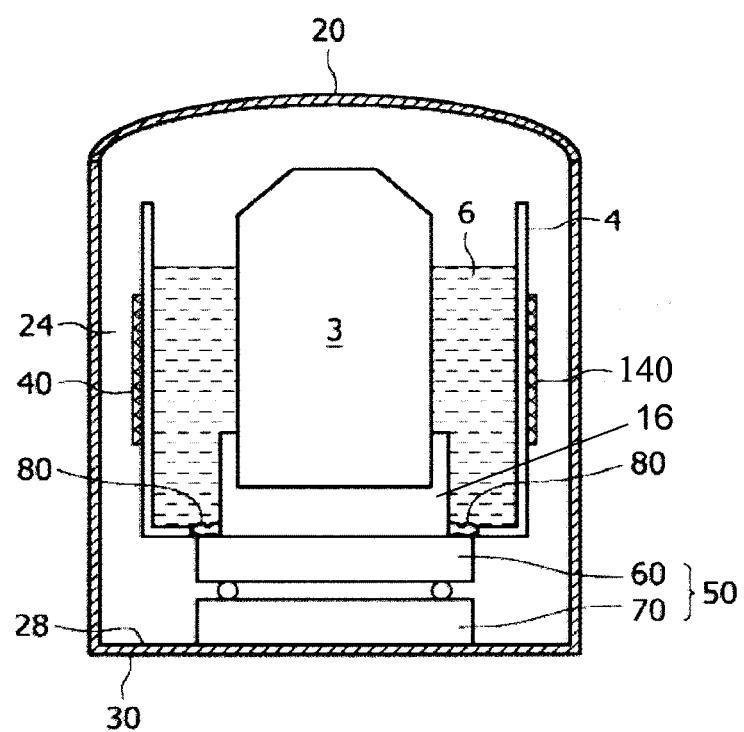
FIG. 5 schematically illustrates a bottle warmer and mixing apparatus according to a further embodiment of the present invention.

Referring to FIG. 5, a further embodiment of the invention also has the mixing unit 50 decoupled from the inner housing 4 and a heating element 140. The inner housing 4 is attached to the mixing unit 50 with a flexible hose 80, with the mount 16 attached to the top of the mixing unit 50. This embodiment is substantially the same as described for FIG. 4, with the following differences.

The heating unit comprises an inductive heating element 140 disposed on an outer surface of the inner housing 4 forming the reservoir walls. The bottle 3 is made of metal or has a metal coating (not shown), such that the bottle 3 has one or more conductive parts. Alternatively, a conductive material may be attached to or in close proximity to the bottle. The inductive heating element 140 is arranged to cause induction heating of the conductive part(s) of the bottle 3. The water of the reservoir 6 may act as a buffer for thermal energy.

The heating element 140 comprises coils and an electronic driver for energizing the coils to generate a magnetic field. The heating unit also includes the conductive part of the bottle, preferably in the form of metal plates, which are heated by the generated magnetic fields. The heating element 140 does not form part of the mass moved by the mixing unit 50, and so is substantially decoupled from the mixing unit 50 and effectively static. The inductive heating element may be decoupled either by the flexible hose or other de-coupling means if attached to the inner housing 4, or may be decoupled by being attached to a static part of the apparatus not connected to the driven part of the mixing unit (e.g. outer housing 20). A heating unit can be considered to be the inductive heating element 140 and the conductive part of the bottle 3 in this embodiment.

Alternatively, the conductive part heated by induction may be located at any point inside the reservoir 6. The water of the reservoir is then heated, which in turn heats the bottle 3.

Alternatively, it is possible to arrange the inductive heating element such that the inductive coil is formed in the static bottom plate 70 of the mixing unit, and the heated conductive (metal) part is located in or on the top plate of the mixing unit. The heated top plate 60 can then heat the bottle. This embodiment also has at least part of the heating unit decoupled from the agitation caused by the mixing unit, since the bottom plate 70 is stationary, and so the inductive coil forming part of the heating unit does not form part of the moved mass. In such an embodiment the flexible hose 80 and inner housing 4 may not be present, since there is no water needed in reservoir 6. Alternatively, the reservoir containing water may be present and act as a thermal buffer. The heating unit can be considered to be the inductive heating element in the bottom plate in this embodiment, and the conductive part in the top plate.

Alternatively, the embodiment of FIG. 5 may use inductive heating without the presence of water around the bottle 3. The heating element 140 is able to directly heat conductive parts of the bottle 3, or conductive parts adjacent to the bottle 3 which can radiate heat to the bottle 3. This heating does not require water in the reservoir 6, and so no reservoir is required or flexible hose is required.

The bottle may include a temperature sensor thereon that alerts a caregiver when a predetermined desired milk temperature has been reached.

In order to more quickly heat and thoroughly mix the contents of the bottle 3, it is preferable to activate the programmable mixing unit 50 to mildly vibrate or shake the contents of the bottle. The vibration keeps the milk fat in solution with the rest of the substrate and thereby prevents separation of the substrate. The vibration also mixes different types of additives that can be added to a formula or breast milk.

The heating element 40;140 can include a built-in thermostat to detect when the fluid temperature has stabilized at the desired level. This also ensures that the milk is thoroughly thawed, warmed but not overheated, and thus provides sufficiently warm milk without the risk of burning the mouth of the baby. The thermostat can produce an output to a light emitting diode that glows or flashes when the desired temperature has been achieved, and preferably includes an auto shutoff timer feature that can power to the heating element 40 after a predetermined time interval. Further, a switch can be provided to modulate the activity between warming and mixing functions.

The present invention may incorporate known baby bottle warmers, baby bottle mixers, and known wiring, switches, timers, controllers and thermostat devices may be incorporated into the present bottle warmer and mixing apparatus.

Figure 6:
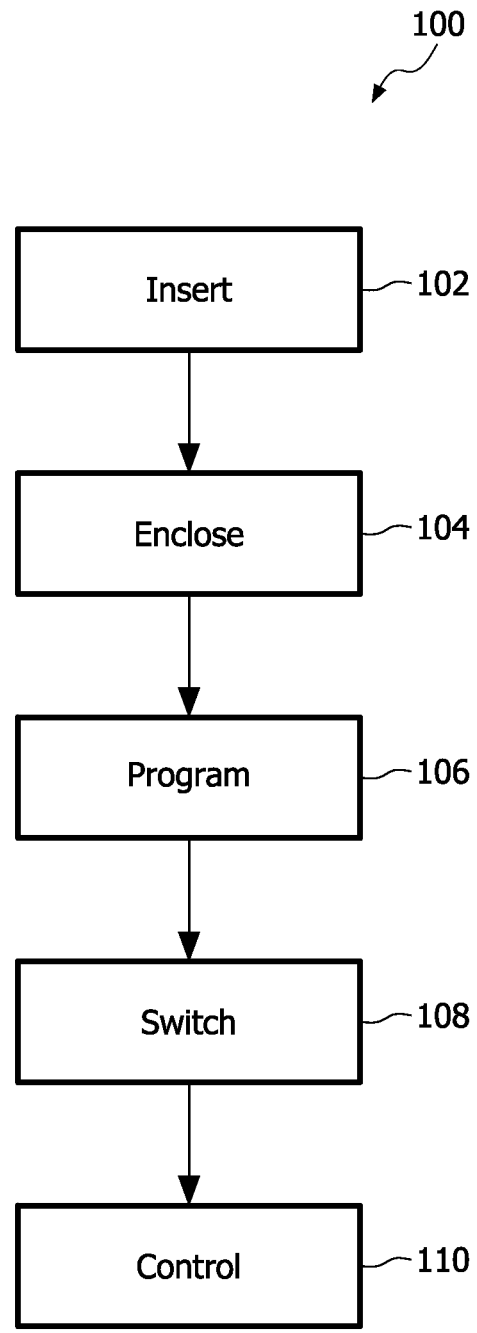
FIG. 6 schematically illustrates a method of warming and mixing the contents of a bottle using the bottle warmer and mixing apparatus of the present invention.

FIG. 6 shows a method 100 of operating the apparatus 1 according to the present invention. In step 102, a bottle 3 containing contents to be mixed is inserted into the inner housing 4 and secured in the mount 16. In optional step 104, the outer container housing is closed to enclose the bottle 3. In step 106, a program on the programmable mixing unit 106 is selected. In step 108, the apparatus 1 is switched on. The heating element 40;140 is initiated to warm the bottle, and the mixing unit 50 starts agitating the contents of the bottle 3. In step 110, the programmable mixing unit is controlled, preferably automatically, in order to vibrate the bottle so that an optimal mixing action is obtained.

The mixing unit 50 has been described as having a top plate 60 provided with magnets 65, and a bottom plate 70 provided with a plurality of coils 68. Alternatively, the top plate 60 may be provided with coils 68, and the bottom plate be provided with magnets 65. Alternatively, any known vibration or movement generator may be used as the mixing unit.

A flexible hose has been described as de-coupling part of the reservoir and/or part of the heating unit from the movement of the mixing unit. Alternatively, any means may be used to de-couple to isolate the agitation of the mixing unit, e.g. a mechanical linkage, sliding plates or free space around the mixing unit in which no contact is made with another part of the apparatus.

In an alternative embodiment, the heating unit may be fully coupled to the mixing unit, and the mixing unit is a dual-axis linear motor. The control of the mixing motion provided by the linear motor allows for efficient mixing even when the heating unit and/or inner housing are moved by the linear motor.

Although claims have been formulated in this application to particular combinations of features, it should be understood that the scope of the disclosure of the present subject matter also includes any novel features or any novel combination of features disclosed herein either explicitly or implicitly or any generalization thereof, whether or not related to the same subject matter as presently claimed in any claim and whether or not it mitigates any or all of the same technical problems as does the present subject matter. Any feature of any of the embodiments may be used with any other feature of any embodiment.

Further, while the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. The Figures

The invention claimed is:

1. A bottle warming and mixing apparatus comprising:
   a mixing unit adapted to controllably agitate a bottle in two dimensions to mix contents of the bottle; and
   a heating unit arranged for heating the contents of the bottle, said heating unit comprising a heating element and a reservoir for receiving the bottle and a fluid for thermally coupling the heating element to said contents of the bottle, said heating element being at least partially decoupled from the agitation generated by the mixing unit by a flexible element separating the reservoir from the mixing unit.

2. A bottle warming and mixing apparatus as claimed in claim 1 wherein the reservoir comprises a reservoir base and reservoir walls upstanding from the reservoir base, said flexible element separating the reservoir base from the mixing unit.

3. A bottle warming and mixing apparatus as claimed in claim 1 wherein the mixing unit comprises a linear induction motor.

4. A bottle warming and mixing apparatus as claimed in claim 1 wherein the mixing unit comprises a first plate provided with a plurality of magnets and a second plate provided with a plurality of coils, wherein applying current through the coils in a pre-defined sequence generates relative movement between the first and the second plates.

5. A bottle warming and mixing apparatus as claimed in claim 1 wherein the mixing unit is programmable to provide a selected one of a plurality of different types of agitation to the bottle.

6. A bottle warming and mixing apparatus as claimed in claim 1 wherein the heating unit comprises an induction heater.

7. A bottle warming and mixing apparatus as claimed in claim 6 wherein the induction heater comprises an inductively heated conductor forming part of the bottle.

8. A bottle warming and mixing apparatus as claimed in claim 6 wherein the induction heater comprises:
   a reservoir for receiving a fluid and for receiving the bottle; and
   at least one inductively heated conductor disposed in the reservoir.

9. A bottle warming and mixing apparatus as claimed in claim 4 wherein the heating element is attached to a stationary one of the first and second plates of the mixing unit.

10. A bottle warming and mixing apparatus as claimed in claim 1 wherein a mount for releasably holding the bottle is coupled to the mixing unit.

\* \* \* \* \*